United States Patent
Shaffer et al.

(10) Patent No.: US 9,817,487 B2
(45) Date of Patent: *Nov. 14, 2017

(54) ROTATION SMOOTHING OF A USER INTERFACE

(71) Applicant: Apple Inc., Cupertino, CA (US)

(72) Inventors: Joshua Shaffer, San Jose, CA (US); Bas Ording, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,762

(22) Filed: Mar. 25, 2016

(65) Prior Publication Data

US 2016/0282962 A1    Sep. 29, 2016

Related U.S. Application Data

(63) Continuation of application No. 12/473,846, filed on May 28, 2009, now Pat. No. 9,298,336.

(51) Int. Cl.
*G09G 5/00* (2006.01)
*G06F 3/0346* (2013.01)
(Continued)

(52) U.S. Cl.
CPC .......... *G06F 3/0346* (2013.01); *G06F 3/0481* (2013.01); *G06F 3/0482* (2013.01);
(Continued)

(58) Field of Classification Search
CPC ...... G06F 3/0482; G06F 8/38; G06F 3/04845; G06F 2200/1637; G06T 13/00; G06T 13/80; G09G 2340/0492
See application file for complete search history.

(56) References Cited

U.S. PATENT DOCUMENTS 5,287,093 A    2/1994  Amano et al.
6,115,025 A *  9/2000  Buxton ................. G06F 1/1601
                                                             345/166
(Continued)

FOREIGN PATENT DOCUMENTS

EP         1052849        11/2000
WO    WO 2001050450        7/2001

OTHER PUBLICATIONS

Microsoft Powerpoint 2007, "Use Sample Animations in Your Presentation," http://office.microsoft.com/en-us/powerpoint-help/use-sample-animations-in-your-presentation-HA010226466. ASPX?CTT=5&origin=HA010021497#BM2, Nov. 30, 2006, 6 pages.

(Continued)

*Primary Examiner* — Sultana M Zalalee
(74) *Attorney, Agent, or Firm* — Morgan, Lewis & Bockius LLP

(57) ABSTRACT

This is directed to animating transitions in a user interface as the orientation of the user interface changes. An electronic device can display a user interface in any suitable orientation, including for example in portrait and landscape modes (e.g., based on the orientation of the display). To provide a resource efficient and aesthetically pleasing transition, the electronic device can pre-render the interface in the final orientation, and define an animation by cross-fading the interface between the initial and final interfaces. In some embodiments, the electronic device can identify distinct regions of the interface, and define separate animations for each region. The separate animations can be overlaid and displayed simultaneously to provide a uniform animated transition between the initial and final interfaces.

12 Claims, 13 Drawing Sheets

(51) Int. Cl.
*G06F 3/0481* (2013.01)
*G06F 3/0484* (2013.01)
*G06F 3/0482* (2013.01)
*G09G 5/38* (2006.01)

(52) U.S. Cl.
CPC ........... *G06F 3/04845* (2013.01); *G09G 5/38* (2013.01); *G09G 2320/08* (2013.01); *G09G 2340/0492* (2013.01)

(56) References Cited

U.S. PATENT DOCUMENTS

| | | | |
|---|---|---|---|
| 6,396,500 B1 | 5/2002 | Qureshi et al. | |
| 6,466,198 B1 | 10/2002 | Feinstein | |
| 6,961,049 B2 | 11/2005 | Mulligan et al. | |
| 7,164,423 B1 | 1/2007 | Westen | |
| 7,176,926 B2 | 2/2007 | Frisken et al. | |
| 7,259,772 B2 | 8/2007 | Koh | |
| 7,594,168 B2 | 9/2009 | Rempell | |
| 9,298,336 B2* | 3/2016 | Shaffer | G06F 3/0481 |
| 2003/0184525 A1 | 10/2003 | Tsai | |
| 2004/0004641 A1 | 1/2004 | Gargi | |
| 2004/0106438 A1 | 6/2004 | Chen | |
| 2004/0243931 A1 | 12/2004 | Stevens et al. | |
| 2005/0010876 A1* | 1/2005 | Robertson | G06F 3/0481 715/782 |
| 2006/0001647 A1 | 1/2006 | Carroll | |
| 2006/0026521 A1 | 2/2006 | Hotelling et al. | |
| 2006/0026535 A1 | 2/2006 | Hotelling et al. | |
| 2006/0282786 A1 | 12/2006 | Shaw et al. | |
| 2007/0094700 A1 | 4/2007 | Wolfe | |
| 2007/0165031 A1 | 7/2007 | Gilbert et al. | |
| 2007/0242136 A1 | 10/2007 | Biagiotti et al. | |
| 2007/0287477 A1 | 12/2007 | Tran | |
| 2008/0077879 A1 | 3/2008 | Black | |
| 2008/0177776 A1 | 7/2008 | Stallings | |
| 2009/0128581 A1 | 5/2009 | Brid et al. | |
| 2009/0204915 A1 | 8/2009 | Yamagami et al. | |
| 2010/0053089 A1 | 3/2010 | Kwok et al. | |
| 2010/0138782 A1 | 6/2010 | Rainisto | |
| 2010/0271398 A1* | 10/2010 | Apted | G06F 3/04845 345/650 |

OTHER PUBLICATIONS

Jquery for Designers, "Image Cross Fade Transition," http:jqueryfordesigners.com/image-cross-fade-transition, Apr. 20, 2008, 7 pages.
Office Action, dated Mar. 13, 2012, received in U.S. Appl. No. 12/473,846, 26 pages.
Final Office Action, dated Aug. 13, 2012, received in U.S. Appl. No. 12/473,846, 32 pages.
Office Action, dated Aug. 26, 2013, received in U.S. Appl. No. 12/473,846, 21 pages.
Final Office Action, dated Apr. 11, 2014, received in U.S. Appl. No. 12/473,846, 21 pages.
Office Action, dated Jan. 12, 2015, received in U.S. Appl. No. 12/473,846, 36 pages.
Final Office Action, dated Jul. 31, 2015, received in U.S. Appl. No. 12/473,846, 19 pages.
Notice of Allowance, dated Nov. 20, 2015, received in U.S. Appl. No. 12/473,846, 16 pages.
International Search Report and Written Opinion, dated Dec. 2, 2010, received in International Patent Application No. PCT/US2010,029473, which corresponds with U.S. Appl. No. 12/473,846, 9 pages.
International Preliminary Report on Patentability, dated Jul. 22, 2011, received in International Patent Application No. PCT/US2010,029473, which corresponds with U.S. Appl. No. 12/473,846, 20 pages.
Office Action, dated Mar. 31, 2017, received in European Patent Application No. 10712641.9, which corresponds with U.S. Appl. No. 12/473,846, 2 pages.

* cited by examiner

ROTATION SMOOTHING OF A USER INTERFACE

RELATED APPLICATIONS

This application is a continuation of U.S. application Ser. No. 12/473,846, filed May 28, 2009, which is incorporated herein by reference in its entirety.

FIELD OF THE INVENTION

This is directed to systems and methods for transitioning a user interface between configurations on a display.

BACKGROUND OF THE INVENTION

Information can be displayed by an electronic device using any suitable interface. In some cases, a user interface can change as the dimensions or perspective of the display. For example, if a device is moved such that the interfaces switches between a portrait mode and a landscape mode, the electronic device can provide two distinct interfaces (e.g., portrait interface and landscape interface). The device can provide a graphical transition between the portrait and landscape interfaces, for example using a graphics engine to render the intermediate frames between the initial and final interfaces. This approach, however, can require significant processing power, which can be of limited supply in portable electronic devices. Alternatively, the electronic device can render only a subset of frames to reduce the processing and power burden of the transition. This, however, can adversely affect the visual appeal of the graphical transition. As still another example, the electronic device can remove displayed elements of the interface, render basic interface elements in the intermediate frames, and re-draw the modified elements after transitioning the content (e.g., re-draw a header bar and keyboard that were previously removed during the transition).

SUMMARY OF THE INVENTION

This is directed to systems, methods and computer-readable media for transitioning user interfaces between configurations. For example, this may define distinct regions in a user interface, and apply rotations, cross-fading, and other transformations to the distinct regions to provide a smooth animation between the configurations.

In some embodiments, a user can direct an electronic device to display information as part of a user interface. The user interface can have any suitable orientation on the device, including for example several possible orientations. For example, the electronic device can have a rectangular display that the user can view in portrait mode or a landscape mode. As another example, the electronic device display can have any other suitable shape or dimensions, such as an asymmetrical shape for which the interface can have different characteristic dimensions based on the orientation of the device. The electronic device can determine the particular orientation for an interface using any suitable approach, including for example based on the output of an accelerometer or other component sensing the orientation of the device.

To animate the change in orientation of the user interface, for example as the user tilts the device to switch between portrait mode and landscape mode, the electronic device can identify distinct regions of the interfaces. For example, the electronic device can identify a navigation bar or header bar at the top of the interface, a keyboard or footer bar at the bottom of the interface, and a content region between the header and footer bars. The electronic device can pre-render the final interface (e.g., after rotation), and use cross-fading or other approaches to individually define a transition for each of the header bar, footer bar, and content region.

In some embodiments, the information in the content region can vary as a result of the animation. For example, text wrapping can change, such that more text is displayed in a landscape mode than in a portrait mode. The electronic device can then define, in the content region, a band of content that either appears or disappears as part of the transition. The band of content can be distributed at any suitable location along the content region, including for example adjacent to a fixed band of options along an edge of the interface (e.g., a band near a band of selectable chevrons displayed along the right side of the interface).

The animation can include any suitable modification of the displayed interface, including for example rotating content, stretching or scaling content, cross-fading content, or inserting or removing content from the displayed interface. In some embodiments, each of the regions of the interface can be associated with specific modifications of the associated content (e.g., cross-fade first portions of content region, and stretch a second portion of the content region).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
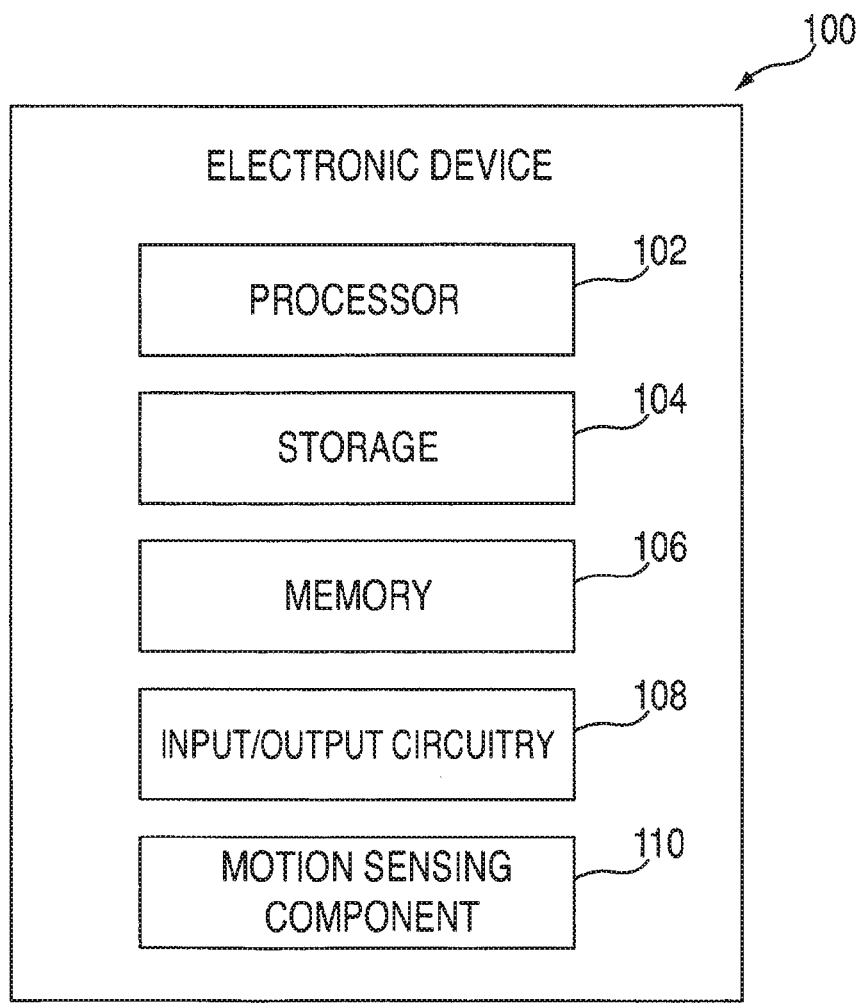
FIG. 1 is a schematic view of an illustrative electronic device providing user interface animations in accordance with one embodiment of the invention.

This is directed to animating transitions in a user interface. In particular, this is directed to animating a change in the user interface as the characteristic dimensions of the display change (e.g., switching from portrait mode to landscape mode).

An electronic device can display different types of interfaces, which can change based on user inputs or interactions with the device. In some cases, the orientation of the electronic device can change, for example such that the display changes from a portrait orientation to a landscape orientation. As another example, the display can be non-rectangular, such that the device can provide other types of orientations (e.g., a triangular display or display defined by any other polygon or shape). When the display orientation changes, the electronic device can change the displayed user interface to match the changed display orientation. In particular, the electronic device can change the size, distribution, or other attributes of the displayed user interface elements to take advantage of the available display space in each orientation.

To provide an aesthetically pleasing interface, the electronic device can provide an animation as the interface changes to match the new orientation. The electronic device can define the animation using any suitable approach. In some embodiments, the electronic device can first identify distinct display regions for which interface transitions can be defined. The electronic device can identify the regions using any suitable approach, including for example from metadata associated with particular regions, or from display properties of the interface elements. Such regions can include, for example, header, status bar, or toolbar regions, a content region, and a footer or keyboard region. The electronic device can define any suitable number of regions distributed at any suitable position on the display The electronic device can pre-render the user interface after changing the display orientation, such that the device can determine the final disposition of displayed elements for each of the identified regions. The electronic device can then cross-fade between the current or initially displayed elements and the pre-rendered elements to define an animation between the initial and final interface. In some embodiments, the animation can be generated as a series of simultaneous and overlaid animations applied to each of the identified regions.

Properties of the elements displayed in each identified region can define the manner in which the animation occurs. In some embodiments, some identified regions can be associated with distorting, scaling or stretching particular elements of the region. For example, displayed buttons can be stretched as the interface switches from a portrait mode to a landscape mode. Some content, however, may not be stretched or scaled to prevent visual artifacts (e.g., do not stretch displayed text). In some embodiments, an identified region can instead or in addition be associated with simple cross-fading, for example with some elements disappearing as other elements appear. In some embodiments, an identified region can instead or in addition be associated with removing or adding displayed elements. For example, an identified region can include a band from which content is removed or to which content is added when the interface transitions. In some embodiments, the band can appear or disappear based on the particular interface orientation. Other content in the same region and adjacent to the band can be modified during the transition to account for the appearance or disappearance of content in the band (e.g., changing the wrapping of text).

FIG. 1 is a schematic view of an illustrative electronic device for providing user interface animations in accordance with one embodiment of the invention. Electronic device 100 can include any suitable type of electronic device operative to display information to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device having a display for which the orientation of an interface can change.

Electronic device 100 can include a processor or control circuitry 102, storage 104, memory 106 and input/output circuitry 108, as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., communications circuitry or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. For example, control circuitry 102 can be used to run operating system applications, firmware applications, media playback applications, media editing applications, or any other application. In some embodiments, the control circuitry can drive a display and process inputs received from a user interface.

Storage 104 can include, for example, one or more storage mediums including a hard-drive, solid state drive, flash memory, permanent memory such as ROM, any other suitable type of storage component, or any combination thereof. Storage 104 can store, for example, media data (e.g., music and video files), application data (e.g., for implementing functions on device 100), firmware, user preference information data (e.g., media playback preferences), authentication information, lifestyle information data, exercise information data, transaction information data, wireless connection information data, subscription information, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that can be stored in storage 104. In some embodiments, memory 106 and storage 104 can be combined as a single storage medium.

Input/output circuitry 108 can be operative to convert (and encode/decode, if necessary) analog signals and other signals into digital data. In some embodiments, input/output circuitry 108 can also convert digital data into any other type of signal, and vice-versa. For example, input/output circuitry 108 can receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, or any other component of electronic device 100. Although input/output circuitry 108 is illustrated in FIG. 1 as a single component of electronic device 100, several instances of input/output circuitry can be included in electronic device 100.

Electronic device 100 can include any suitable mechanism or component for allowing a user to provide inputs to input/output circuitry 108. For example, electronic device 100 can include any suitable input interface, such as for example, a button, keypad, dial, a click wheel, or a touch screen. In some embodiments, electronic device 100 can include a capacitive sensing mechanism, or a multi-touch capacitive sensing mechanism. Some sensing mechanisms are described in commonly owned Hotelling et al. U.S. Published Patent Application No. 2006/0026521, filed Jul. 30, 2004, entitled "Gestures for Touch Sensitive Input Device," and Hotelling et al. U.S. Published Patent Application No. 2006/0026535, filed Jan. 18, 2005, entitled "Mode-Based Graphical User Interfaces for Touch Sensitive Input Device," both of which are incorporated herein in their entirety.

In some embodiments, electronic device 100 can include specialized output circuitry associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

In some embodiments, I/O circuitry 108 can include display circuitry (e.g., a screen or projection system) for providing a display visible to the user. For example, the display circuitry can include a screen (e.g., an LCD screen) that is incorporated in electronics device 100. As another example, the display circuitry can include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display (e.g., display 130, FIG. 1). The display circuitry can be associated with any suitable characteristic length defining the size and shape of the display. For example, the display can be rectangular or have any other polygonal shape, or alternatively be defined by a curved or other non-polygonal shape. The display can have one or more primary orientations for which an interface can be displayed, or can instead or in addition be operative to display an interface along any orientation selected by the user (e.g., a circular display).

Motion-sensing component 110 can be operative to detect movements of electronic device 100. In some embodiments, a motion-sensing component can include one or more three-axes acceleration motion-sensing components (e.g., an accelerometer) operative to detect linear acceleration in three directions (i.e., the x or left/right direction, the y or up/down direction, and the z or out of the plane of the electronic device display). As another example, a motion-sensing component can include one or more two-axis acceleration motion-sensing components which can be operative to detect linear acceleration only along each of x or left/right and y or up/down directions (or any other pair of directions). In some embodiments, a motion-sensing component can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, the motion-sensing component can indirectly detect rotation, rotational movement, angular displacement, tilt, position, orientation, motion along a non-linear (e.g., arcuate) path, or any other non-linear motions. For example, if the motion-sensing component is a linear motion-sensing component, additional processing can be used to indirectly detect some or all of the non-linear motions. For example, by comparing the linear output of the motion-sensing component with a gravity vector (i.e., a static acceleration), the motion-sensing component can calculate the tilt of electronic device 100 with respect to the y-axis. In some embodiments, the motion-sensing component can instead or in addition include one or more gyro-motion-sensing components or gyroscopes for directly detecting rotational movement. For example, motion-sensing component 110 can include a rotating or vibrating element. As another example, motion-sensing component 110 can include a magnometer operative to detect the orientation of the device relative a magnetic north pole. The electronic device can monitor changes in the output of the magnometer to detect rotations of the device. Using the motion sensing component, the electronic device can determine a preferred orientation for a user interface to display using I/O circuitry 108.

In some embodiments, electronic device 100 can include a bus operative to provide a data transfer path for transferring data to, from, or between control processor 102, storage 104, memory 106, input/output circuitry 108, motion sensing component 110, and any other component included in the electronic device.

Figure 2:
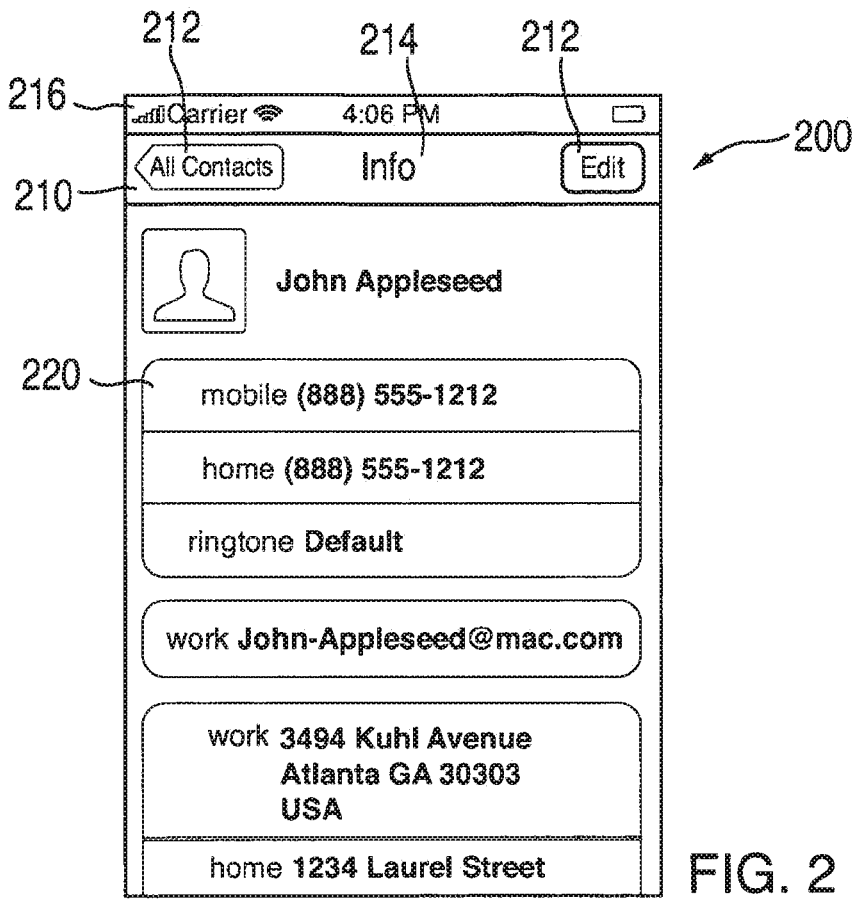
FIG. 2 is a schematic view of a portrait user interface of a contacts application in accordance with one embodiment of the invention.
Figure 3:
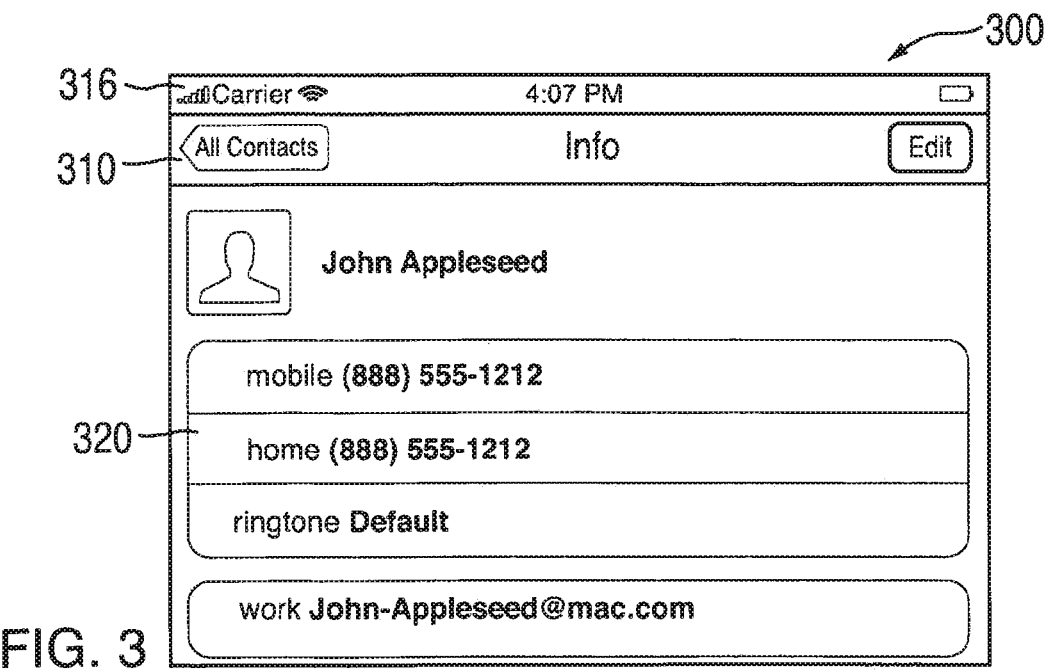
FIG. 3 is a schematic view of a landscape user interface of a contacts application in accordance with one embodiment of the invention.

The orientation of a user interface can be changed in many different types of applications. For example, the orientation of the user interface can change in applications providing textual information, graphical information, or combinations of these. For illustration purposes, the following discussion will describe changing the orientation of a user interface in the context of a contacts application and of a mail application. It will be understood, however, that this discussion can apply to any other suitable application or interface provided by an electronic device. FIG. 2 is a schematic view of a portrait user interface of a contacts application in accordance with one embodiment of the invention. FIG. 3 is a schematic view of a landscape user interface of a contacts application in accordance with one embodiment of the invention. Display 200 can include navigation bar 210 and content region 220. Navigation bar 210 can include several selectable options 212 for navigating within the contacts application, and notice 214 identifying the current menu or display provided within the contacts application. In some embodiments, display 200 can include status bar 216 indicating the overall status of the electronic device. In landscape mode, display 300 can include navigation bar 310, status bar 316, and content region 320, which can include some or all of the features of the corresponding regions of display 200. The particular disposition and size of each of the regions, and of display elements or options displayed within each region can change as the interface switches between displays 200 and 300.

Figure 4A:
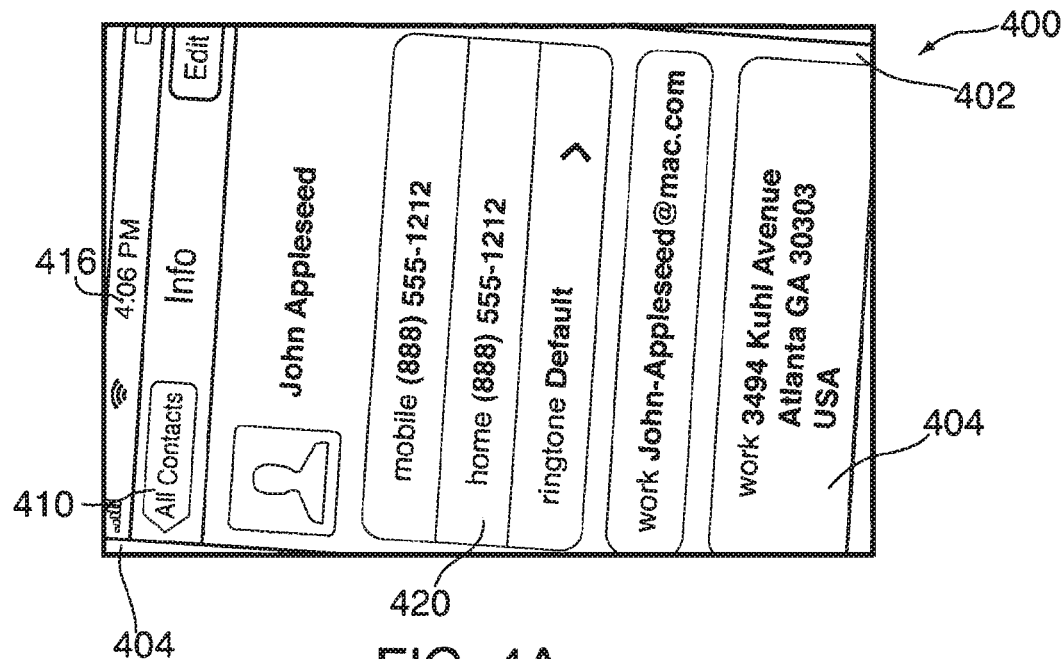
FIGS. 4A-C are schematic views of successive displays as the interface transitions from display 200 to display 300 in accordance with one embodiment of the invention.
Figure 4B:
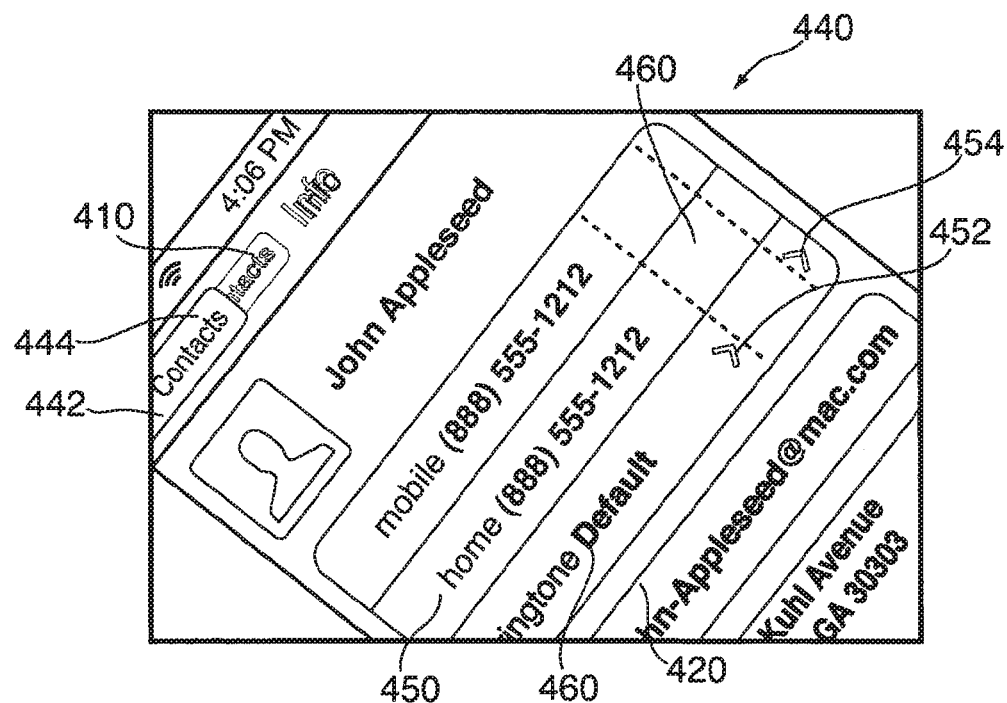
Figure 4C:
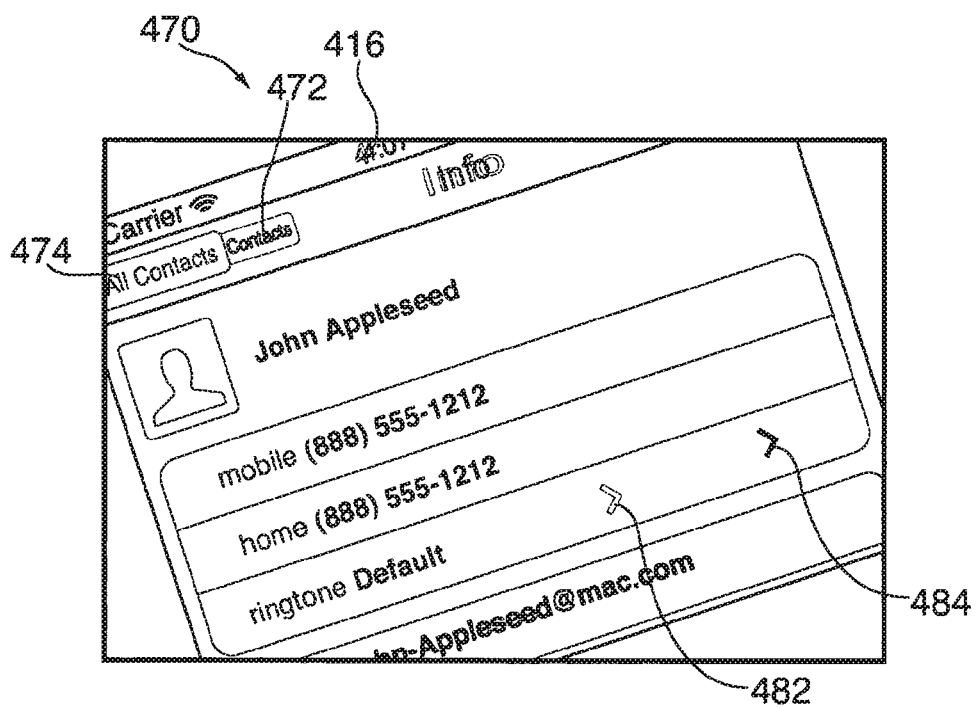

To animate the transition between interfaces 200 and 300, the electronic device can apply rotations, cross-fading, scaling, or other transformations to generate a smooth animation between the interfaces. The particular transition elements to use can be determined using any suitable approach, including for example based on attributes or properties of individual elements or regions of the interface (e.g., properties identified by a graphics engine generating the interface). FIGS. 4A-C are schematic views of successive displays as the interface transitions from display 200 to display 300 in accordance with one embodiment of the invention. Display 400, as well as displays 440 and 470, can include navigation bar 410, status bar 416 and content region 420, which can include some or all of the features of the corresponding regions of FIGS. 2 and 3. As the interface begins to rotate, edges 402 of the interface can appear to rotate behind the edges of the display such that background 404 appears in the corners of the display. Initially, the animation can appear as a simple rotation of display 200 (FIG. 2). In some embodiments the electronic device can determine individual transformations for each region or bar of the display, and combine the transformations to generate the display animation (e.g., by overlaying the transformed regions in the order set by the display or by graphics circuitry).

As the animation progresses, the electronic device can cross-fade between the initial and final interfaces such that displayed elements of the initial interface that are not on the final interface start to disappear. In addition, display elements new to the final interface may begin to appear. As shown in display 440, option 442 can begin to disappear as option 444 appears in navigation bar 410. As another example, chevron 452, which appears in the center of field 450 of content region 420, can begin to disappear as chevron 454 begins to appear at the end of field 450. The cross-fading effect can apply to some or all display elements of display 440, including for example elements of the status bar, navigation bar, content region, or other regions of the display. Band 460 between chevrons 452 and 454 can stretch as part of the animation, such that the text in band 462, between the edge of display 440 and chevrons 452 and 454 does not stretch and become distorted. The implementation of bands such as band 460 will be discussed below in more detail. During the display transition, information or content may be displayed throughout the transition (e.g., a region is not removed from the display during the transition, and then re-inserted post-transition). Alternatively, different regions can remain overlaid during the transitions.

The height taken by each of navigation bar 410, status bar 416 and content region 420 can vary as the display transitions. In particular, the height of some or all of the regions can change (e.g., become smaller) based on the dimensions of the final regions (e.g., in display 300). In some embodiments, the amount of information displayed in each region can change based on the transition (e.g., display successively less contact information in content region 420 in displays 400, 440 and 470). As shown in display 470, the options or display elements initially present in display 400 can finish fading out and be replaced with new elements of display 300 (e.g., options 472 and 474, chevrons 482 and 484, and time, carrier and WiFi icons of the status bar). Once the cross-fading has completed, display 470 can finish rotating to match display 300.

Figure 5:
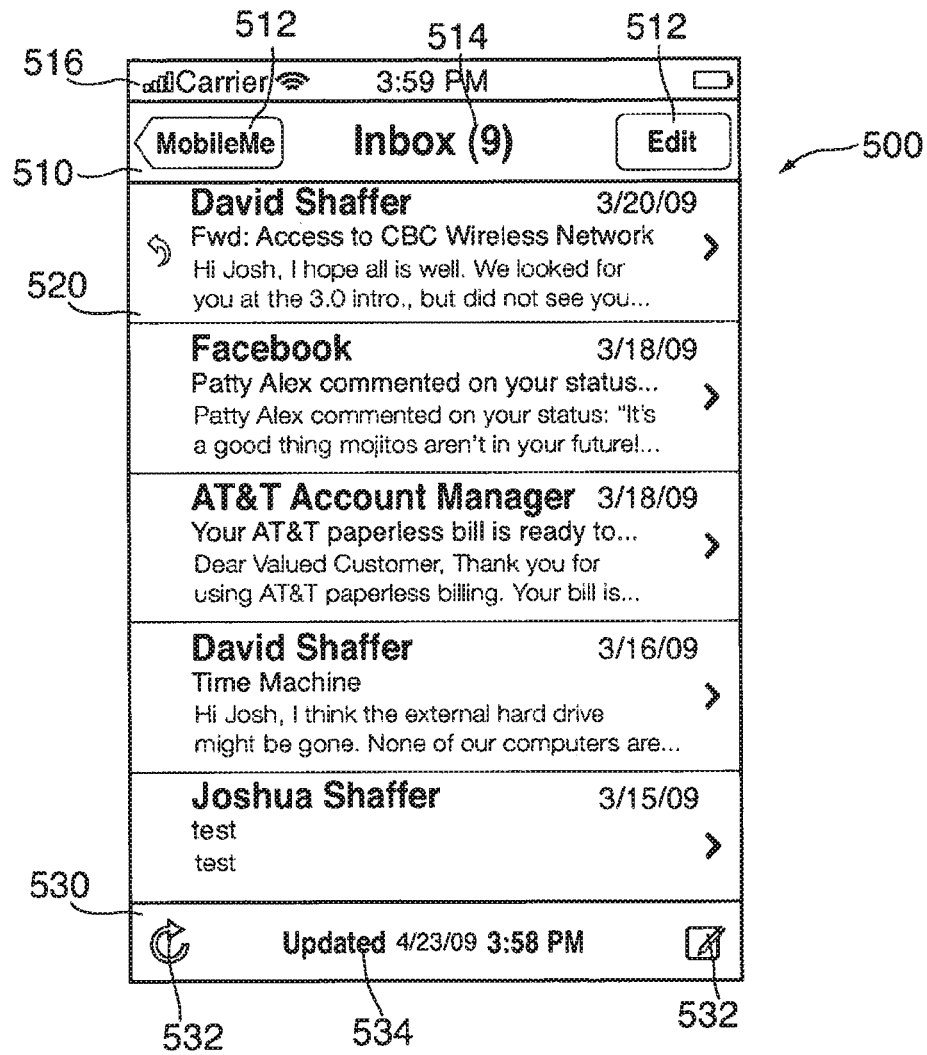
FIG. 5 is a schematic view of a portrait user interface of a mail application in accordance with one embodiment of the invention.
Figure 6:
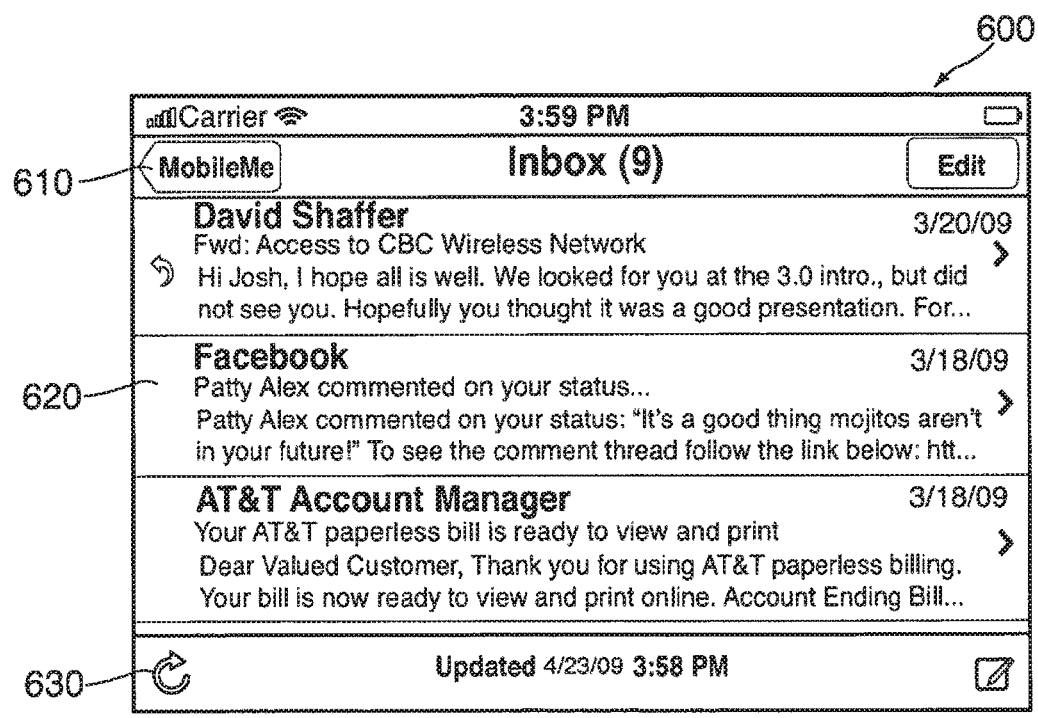
FIG. 6 is a schematic view of a landscape user interface of a mail application in accordance with one embodiment of the invention.

In some embodiments, a display can have additional regions or bars than those shown in the contacts application of FIGS. 2-4C. For example, a mail application can in addition include a toolbar disposed along an end of the display. FIG. 5 is a schematic view of a portrait user interface of a mail application in accordance with one embodiment of the invention. FIG. 6 is a schematic view of a landscape user interface of a mail application in accordance with one embodiment of the invention. Display 500 can include navigation bar 510 and status bar 516 disposed at the top of display 500, toolbar 530 disposed at the bottom of display 500, and content region 520 disposed between navigation bar 510 and toolbar 530 for providing information or other content to the user. Navigation bar 510 and toolbar 530 can include several selectable options 512 and 532, respectively, for navigating within the mail application and directing the mail application to perform mail operations, and notices 514 and 534, respectively, for identifying the current menu, display or past, current or future operation of the mail application In landscape mode, display 600 can include navigation bar 610, status bar 616, content region 620, and toolbar 630 which can include some or all of the features of the corresponding regions of display 500. The particular disposition and size of each of the regions, and of display elements or options displayed within each region can change as the interface switches between displays 500 and 600.

Figure 7A:
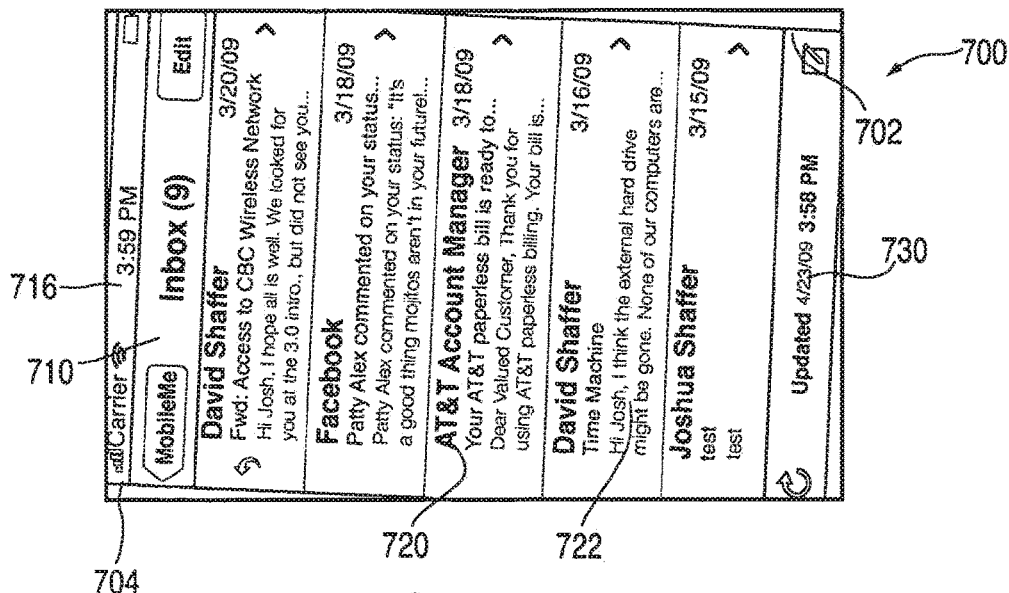
FIGS. 7A-C are schematic views of successive displays as the interface transitions from display 500 to display 600 in accordance with one embodiment of the invention.
Figure 7B:
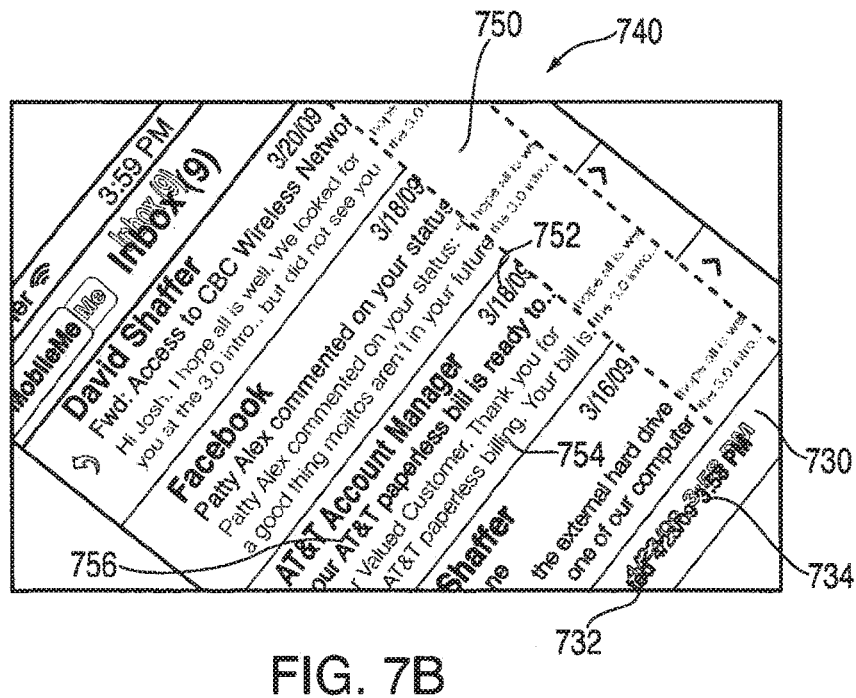
Figure 7C:
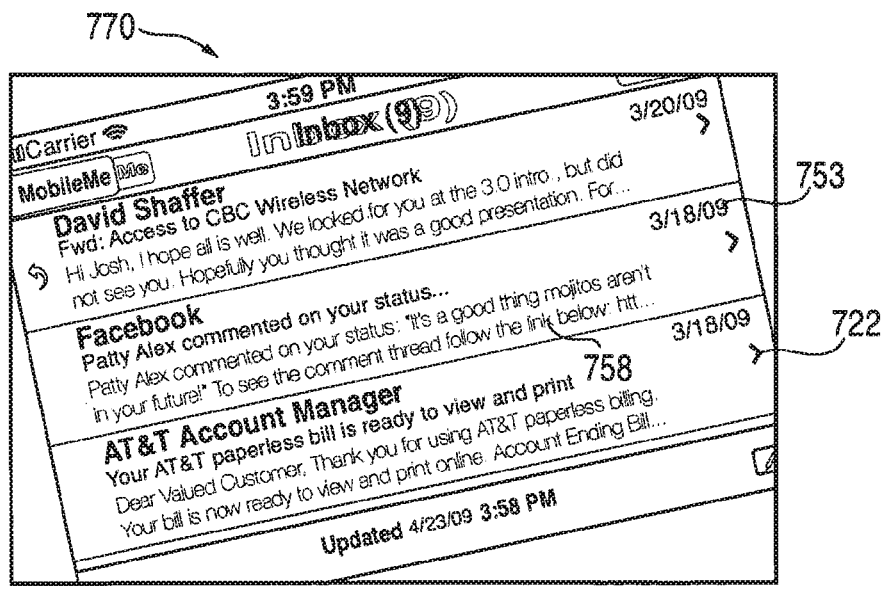

To animate the transition between interfaces 500 and 600, the electronic device can apply rotations, cross-fading, scaling, or other transformations to generate a smooth animation between the interfaces. FIGS. 7A-C are schematic views of successive displays as the interface transitions from display 500 to display 600 in accordance with one embodiment of the invention. Display 700, as well as displays 740 and 770, can include navigation bar 710, status bar 716, content region 720 and toolbar 730, which can include some or all of the features of the corresponding regions of FIGS. 5 and 6. As the interface begins to rotate, edges 702 of the interface can appear to rotate behind the edges of the display such that background 704 appears in the corners of the display. Initially, the animation can appear as a simple rotation of display 500 (FIG. 5). In some embodiments the electronic device can determine individual transformations for each region or bar of the display, and combine the transformations to generate the display animation (e.g., by overlaying the transformed regions in the order set by the display).

As the animation progresses, the electronic device can cross-fade between the initial and final interfaces such that displayed elements of the initial interface that are not on the final interface start to disappear. In addition to the transitions of navigation bar 710, status bar 716 and content region 720, which can include some or all of the features of the transitions described in the context of the displays of FIGS. 4A-C, the electronic device can animate the transition of toolbar 730. As shown in display 740, toolbar 730 can include initial status information 732 that fades out to be replaced by final status information 734. In addition, the dimensions of toolbar 730 can change such that the length of the toolbar increases while the height of the toolbar decreases.

Content region 720 can include several listings 722 in which information is displayed to the user. For example, each listing 722 can include information identifying an email message, and a preview of the email message. When content region 720 transitions, the width of each listing 722 can change such that more content can be displayed in each listing 722. Because each listing includes text, the listing cannot simply be stretched to fit the new width, as the text may become unreadable. Instead, content region can include stretchable band 750 that may appear within content region 720. The width of band 750 can be selected based on the change in width of content region 720 as the interface transitions from display 500 to display 600. Band 750 can be positioned at any suitable location within content region 720 (or any other region of the display). In some embodiments, the band position can be selected such that a reduced number of graphical elements are removed and re-drawn on the other side of or within the band. For example, the band can be positioned between the email preview text and the displayed chevrons for selecting the listing. In some embodiments, the band position can vary or be defined by non-linear boundaries. For example, the band can be inserted between the email preview text and the chevrons, and then jump to between the date and the email title (e.g., a boundary with crenellations). In some embodiments, a region of the display can include several bands. The bands of the content region can stretch between any suitable dimensions, including for example such that the bands disappear in the un-stretched interface. The band position and characteristics may be determined or defined using any suitable approach, including for example as properties of the display elements of the interface (e.g., when the interface is built by a graphics engine).

To use the extra space provided by band 750, the electronic device can change the text displayed in content region 720. In some embodiments, the electronic device can determine the re-wrapped text from the final interface (e.g., display 600), and cross-fade the text in band 750 and in regions adjacent to band 750. For example, the electronic device can fade time stamp 752 and text 754 representing the textual portions that change from display 500 to display 600. Text 756, which can be the same within each listing 722 as the display transitions, can remain un-faded. New text 758 can appear in band 750 to provide the re-wrapped text of each listing 722, as shown more clearly in display 770 (e.g., including email text 758 and new time stamp 753). When the reverse transition occurs (e.g., from display 600 to display 500), the text or content in band 750 may disappear and be re-wrapped or repositioned in portions of content region 720 other than band 750.

In some embodiments, one or more dimensions of content in content region 720 can remain the same. For example, the height of each listing 722 can remain the same (e.g., two lines of email previews are displayed). Similarly, other elements in content region 720 or in another region that can be scrolled to display different content can have a fixed dimension to ensure that the user is provided with a consistent interface. Once the cross-fading and other transition effects are completed, display 770 can finish rotating to match display 600.

Figure 8:
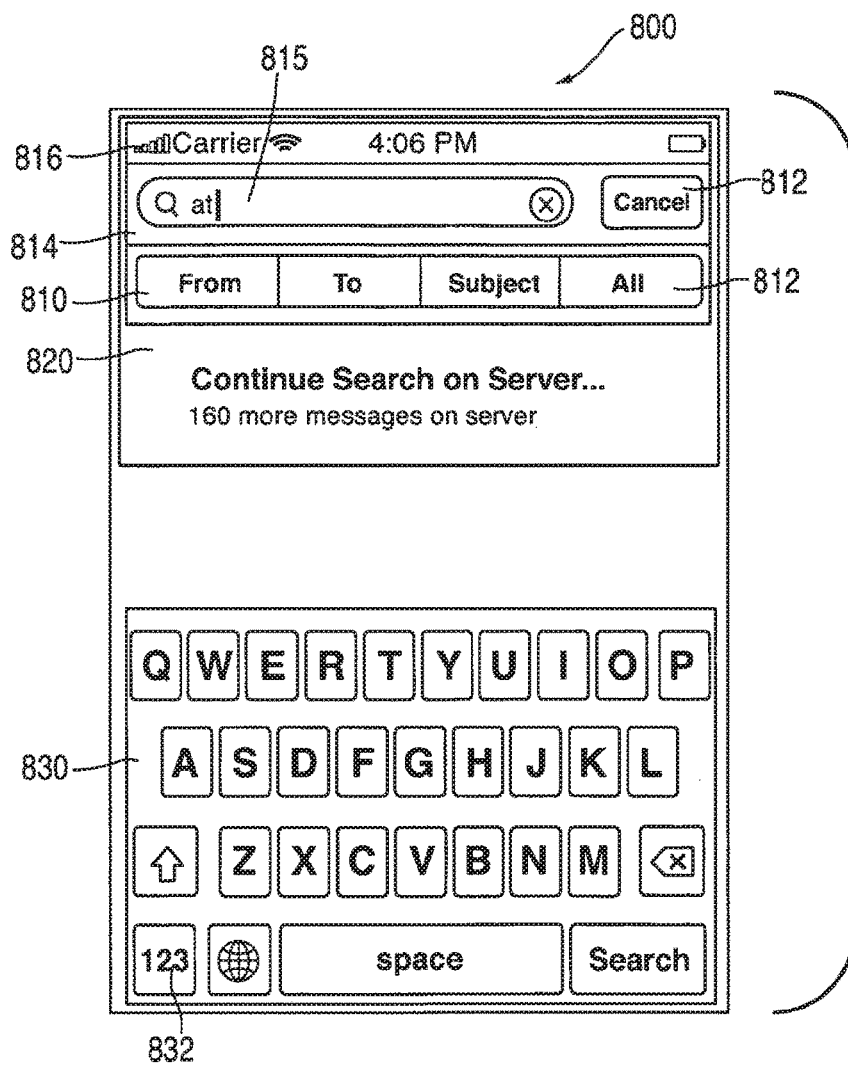
FIG. 8 is a schematic view of a portrait user interface of a mail application with a keyboard in accordance with one embodiment of the invention.
Figure 9:
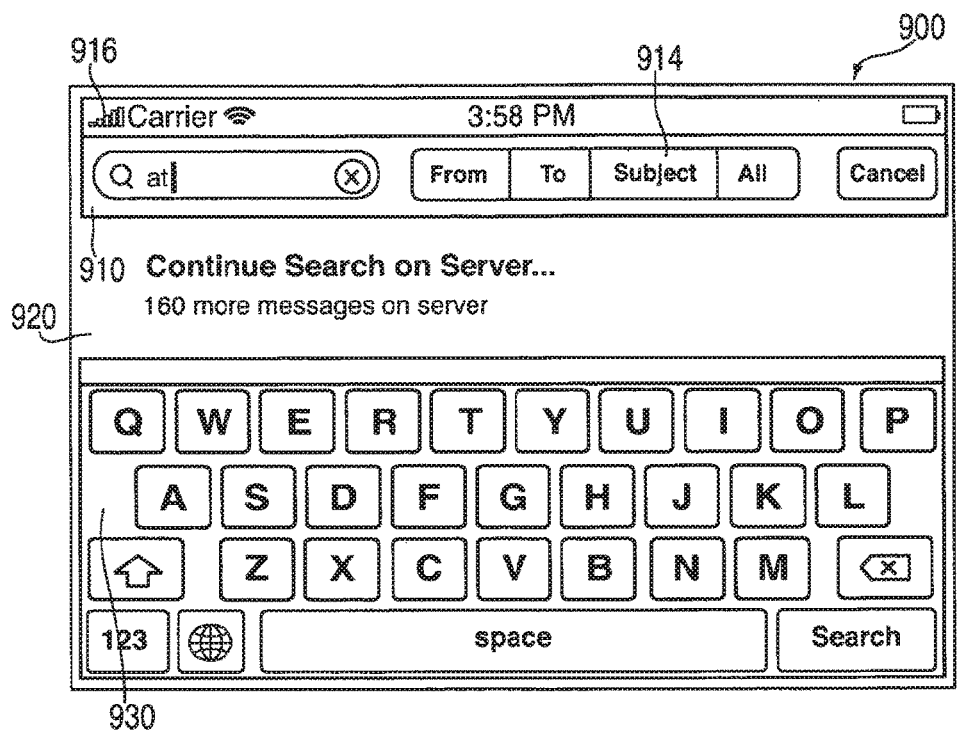
FIG. 9 is a schematic view of a landscape user interface of a mail application with a keyboard in accordance with one embodiment of the invention.

In some embodiments, a display can have a more substantial bar or region, or additional bars or regions over one or both of the top and bottom of the display. For example, a display can include a keyboard overlaid on an application for entering text, for example in the context of a mail or web-browsing application. As another example, a display can include a search bar positioned between a status bar and a navigation bar. FIG. 8 is a schematic view of a portrait user interface of a mail application with a keyboard in accordance with one embodiment of the invention. FIG. 9 is a schematic view of a landscape user interface of a mail application with a keyboard in accordance with one embodiment of the invention. Display 800 can include navigation bar 810, search bar 814, and status bar 816 disposed at the top of display 800, keyboard 830 disposed at the bottom of display 800, and content region 820 disposed between navigation bar 810 and keyboard 830 for providing information or other content to the user. Navigation bar 810 and search bar 814 can include several selectable options 812 for navigating within the mail application and selecting search terms. Search bar 814 can in addition include field 815 in which a user can enter text strings for which to search (or for any other suitable purpose, based on the nature of the bar in which the field is found). Keyboard 830 can include keys 832, which can be distributed in any suitable manner. In some embodiments, keys can be distributed in several rows, with control keys disposed on a separate row (e.g., 4 row keyboard). Alternatively, the control keys can be distributed with the letter keys (e.g., a 3 row keyboard). In some embodiments, the size of one or more keys 832 can change as keyboard 830 switches between portrait and landscape mode. In landscape mode, display 900 can include navigation and search bar 912, content region 920, and keyboard 930 which can include some or all of the features of the corresponding regions of display 800. The particular disposition and size of each of the regions, and of display elements or options displayed within each region can change as the interface switches between displays 800 and 900.

Figure 10A:
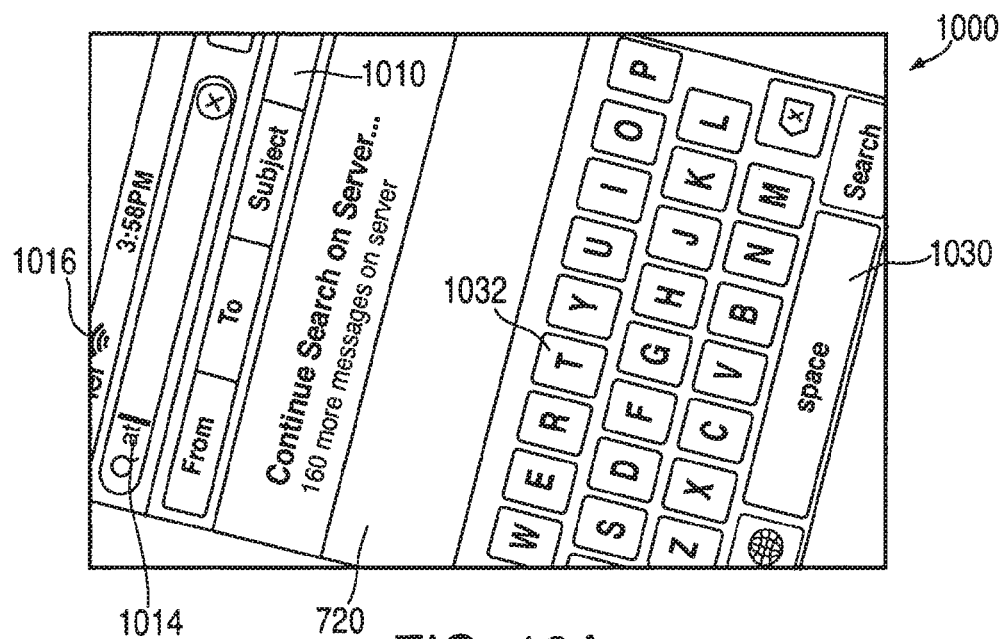
FIGS. 10A-C are schematic views of successive displays as the interface transitions from display 800 to display 900 in accordance with one embodiment of the invention.
Figure 10B:
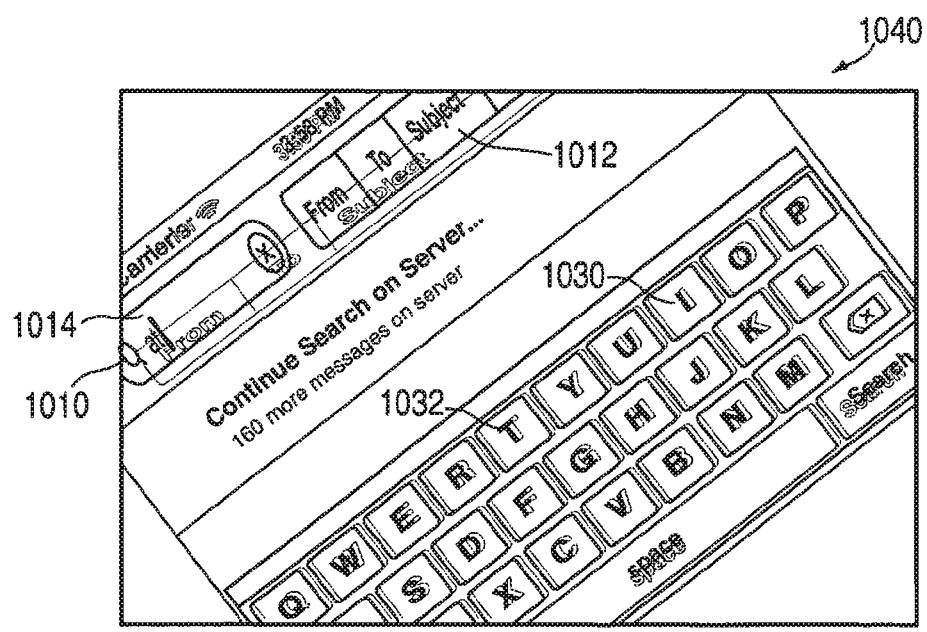
Figure 10C:
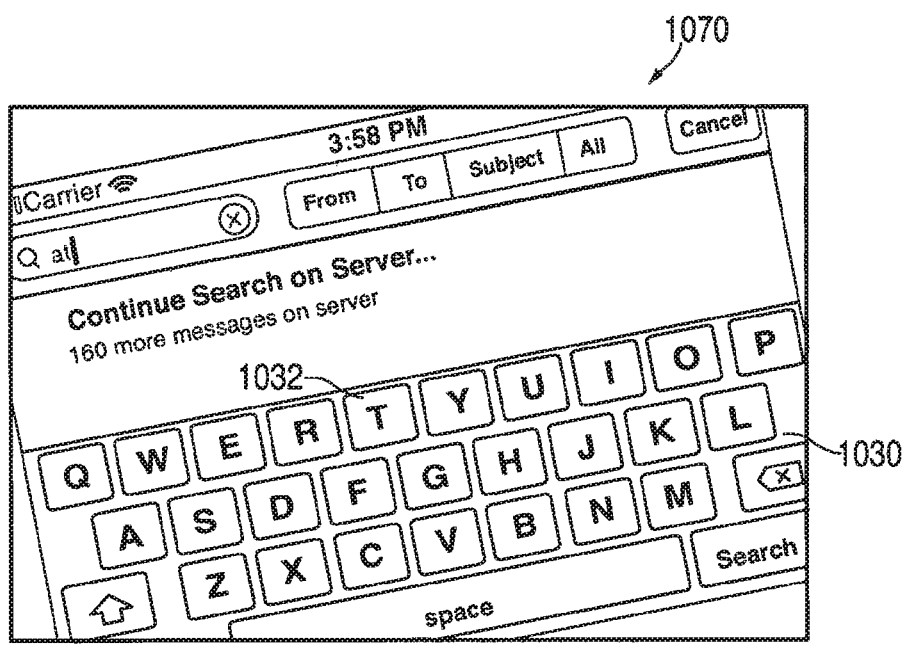

To animate the transition between interfaces 800 and 900, the electronic device can apply rotations, cross-fading, scaling, or other transformations to each of the regions to generate a smooth animation between the interfaces. FIGS. 10A-C are schematic views of successive displays as the interface transitions from display 800 to display 900 in accordance with one embodiment of the invention. Display 1000, as well as displays 1040 and 1070, can include navigation bar 1010, search bar 1014, status bar 1016, content region 1020 and keyboard 1030, which can include some or all of the features of the corresponding regions of FIGS. 8 and 9. As the interface begins to rotate, the edges of the interface can appear to rotate behind the edges of the display such that a background appears in the corners of the display (e.g., as described above in connection with FIGS. 4A-C and FIGS. 7A-C). Initially, the animation can appear as a simple rotation of display 800 (FIG. 8). In some embodiments the electronic device can determine individual transformations for each region or bar of the display, and combine the transformations to generate the display animation (e.g., by overlaying the transformed regions in the order set by the display). In some embodiments, several regions can be combined as part of the transformation.

As the animation progresses, the electronic device can cross-fade between the initial and final interfaces such that displayed elements of the initial interface that are not on the final interface start to disappear. In addition to the transitions of status bar 1016 and content region 1020, which can include some or all of the features of the transitions described in the context of the displays of FIGS. 4A-C, the electronic device can animate the transition of navigation bar 1010 and search bar 1014. Initially, navigation bar 1010 and search bar 1014 can be displayed as distinct bars stacked on the display. When the interface transitions, as shown in display 1040, the originally displayed elements of navigation bar 1010 and search bar 1014 can fade and elements of combined navigation and search bar 1012 can appear. In some embodiments, the height of navigation bar 1010 and search bar 1014 can be reduced to match the height of navigation and search bar 1012 as part of the transition.

Keyboard 1030 can include several keys 1032. The distribution of keys 1032, as well as the size of individual keys can vary based on the orientation of the interface. For example, in display 1000, the height of the keys can be larger than the width of the keys, and the vertical key spacing can be larger than the horizontal key spacing. In display 1070, the height of the keys can be smaller than the width of the keys, and the vertical key spacing can be substantially the same as or less than the horizontal key spacing. As the interface transitions, the electronic device can cross-fade the keys from the initial display (e.g., display 1000) to the final display (e.g., display 1070) without stretching the letters or text displayed on the keys (e.g., to avoid rendering the keys unreadable. Once the cross-fading and other transition effects are completed, display 1070 can finish rotating to match display 900.

Figure 11:
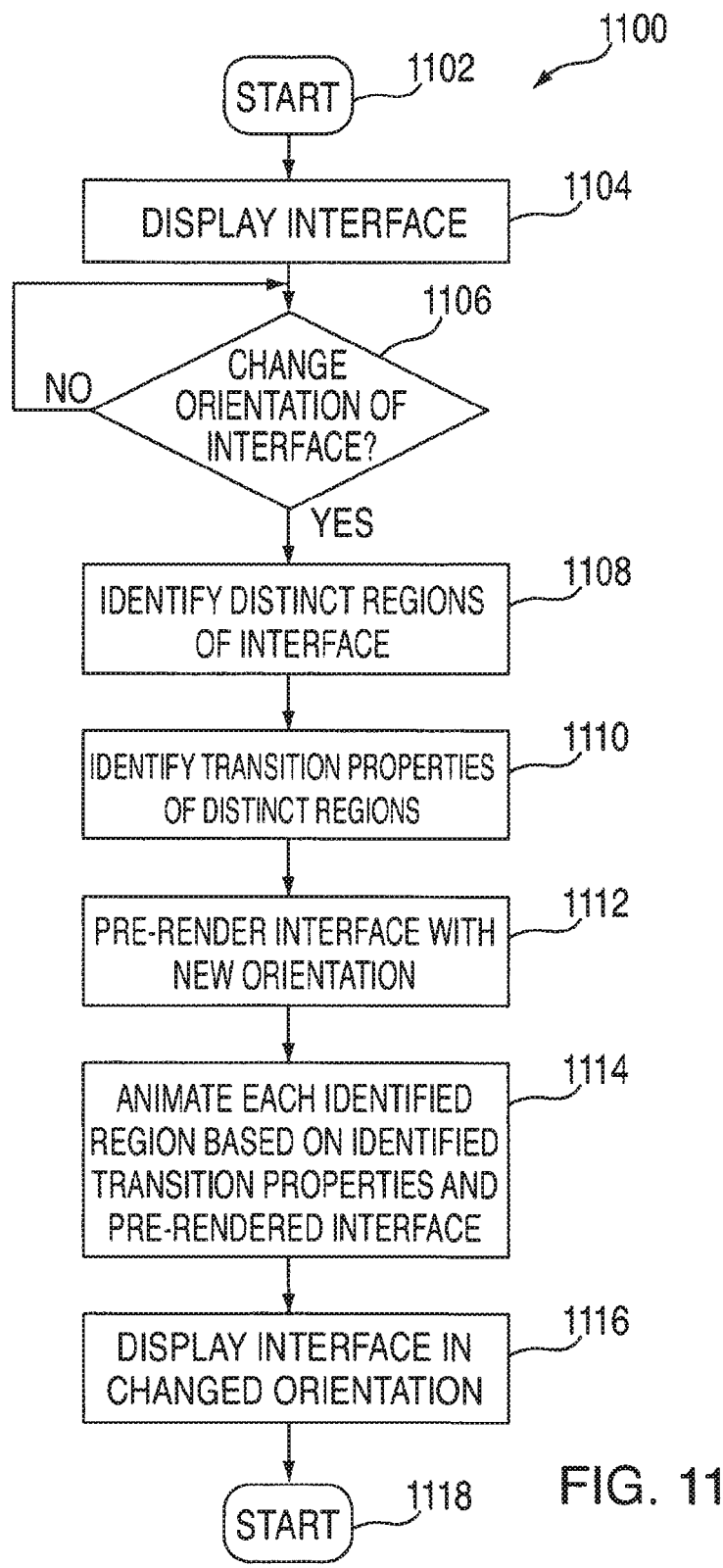
FIG. 11 is a flowchart of an illustrative process for providing an animated transition between interfaces of an electronic device.

FIG. 11 is a flowchart of an illustrative process for providing an animated transition between interfaces of an electronic device. Process 1100 can begin at step 1102. At step 1104, the electronic device can display an interface. For example, the electronic device can display a series of elements, including content and selectable options, forming an interface used to interact with electronic device operations. At step 1106, the electronic device can determine whether an instruction to change the orientation of the interface was received. For example, the electronic device can determine whether a motion sensing component or other sensor of the device provides an output indicating that the orientation of the display, the interface, or both should change (e.g., the user tilted the display). If the electronic device determines that no instruction to change the orientation of the interface has been provided, process 1100 can return to step 1106 and continue to monitor for an instruction to change the interface orientation.

If, at step 1106, the electronic device instead determines that an instruction to change the orientation of the interface was received, process 1100 can move to step 1108. At step 1108, the electronic device can identify distinct regions of the interface. For example, the electronic device can identify different bars or regions of content, or individual display elements forming the bars or regions of the interface. At step 1110, the electronic device can identify transition properties associated with each of the identified regions. For example, the electronic device can identify, for each of the regions, the manner in which to scale, stretch, cross-fade, rotate, or otherwise animate the transition of each region as the orientation of the interface changes. At step 1112, the electronic device can pre-render the interface in the new orientation. For example, the electronic device can direct a graphics engine to provide a pre-rendering of the interface, with the appropriate and current content, to the graphics circuitry defining the interface transition.

At step 1114, the electronic device can animate each of the identified regions based on the transition properties identified at step 1110 and the pre-rendered interface at step 1112. For example, the electronic device can define the transition for each of the identified regions, where the defined animation begins with the initial interface and ends with the final interface in the new orientation. At step 1116, the electronic device can display the interface in the new orientation. Process 1100 can then end at step 1118.

The above described embodiments of the invention are presented for purposes of illustration and not of limitation, and the present invention is limited only by the claims which follow.

What is claimed is:

1. A method, comprising:
   at an electronic device with a display and one or more sensors configured to detect orientation and rotation of the electronic device:
      while the electronic device is in a first orientation, displaying, on the display, a user interface for an application that includes a plurality of selectable elements, wherein the user interface for the application is displayed in a portrait orientation while the device is in the first orientation;
      while displaying the user interface in the portrait orientation, detecting, with the one or more sensors, rotation of the electronic device to a second orientation, and,
      in response to detecting rotation of the electronic device to the second orientation, rotating the user interface for the application into a second orientation, wherein the user interface for the application is displayed in a landscape orientation while the device is in the second orientation, wherein rotating the user interface for the application into the second orientation includes:
         displaying first movement of a portion of the user interface of the application in the portrait orientation off of the display, the portion of the user interface including at least a portion of a first selectable element of the plurality of selectable elements, wherein the first movement is a rotation in a first direction; and
         displaying second movement of a portion of the user interface of the application in the landscape orientation onto the display, the portion of the user interface including at least a portion of a second selectable element of the plurality of selectable elements, wherein the second movement is a rotation in the first direction.

2. The method of claim 1, wherein a background appears in corners of the display, behind the user interface, as the user interface of the application begins to rotate.

3. The method of claim 1, wherein a third selectable element of the plurality of selectable elements remains displayed during the user interface rotation.

4. The method of claim 1, wherein the user interface of the application is displayed in a bounding region and the bounding region is rotated from the first orientation to the second orientation.

5. An electronic device, comprising:
   a display;
   one or more sensors configured to detect orientation and rotation of the device;
   one or more processors;
   memory; and
   one or more programs, wherein the one or more programs are stored in the memory and configured to be executed by the one or more processors, the one or more programs including instructions for:
      while the electronic device is in a first orientation, displaying, on the display, a user interface for an application that includes a plurality of selectable elements, wherein the user interface for the application is displayed in a portrait orientation while the device is in the first orientation;
      while displaying the user interface in the portrait orientation, detecting, with the one or more sensors, rotation of the electronic device to a second orientation, and,
      in response to detecting rotation of the electronic device to the second orientation, rotating the user interface for the application into a second orientation, wherein the user interface for the application is displayed in a landscape orientation while the device is in the second orientation, wherein rotating the user interface for the application into the second orientation includes:

displaying first movement of a portion of the user interface of the application in the portrait orientation off of the display, the portion of the user interface including at least a portion of a first selectable element of the plurality of selectable elements, wherein the first movement is a rotation in a first direction; and displaying second movement of a portion of the user interface of the application in the landscape orientation onto the display, the portion of the user interface including at least a portion of a second selectable element of the plurality of selectable elements, wherein the second movement is a rotation in the first direction.

6. The device of claim 5, wherein a background appears in corners of the display, behind the user interface, as the user interface of the application begins to rotate.

7. The device of claim 5, wherein a third selectable element of the plurality of selectable elements remains displayed during the user interface rotation.

8. The device of claim 5, wherein the user interface of the application is displayed in a bounding region and the bounding region is rotated from the first orientation to the second orientation.

9. A non-transitory computer readable storage medium storing one or more programs, the one or more programs comprising instructions, which when executed by an electronic device with a display and one or more sensors configured to detect orientation and rotation of the electronic device, cause the electronic device to:

while the electronic device is in a first orientation, display, on the display, a user interface for an application that includes a plurality of selectable elements, wherein the user interface for the application is displayed in a portrait orientation while the device is in the first orientation;

while displaying the user interface in the portrait orientation, detect, with the one or more sensors, rotation of the electronic device to a second orientation, and, in response to detecting rotation of the electronic device to the second orientation, rotate the user interface for the application into a second orientation, wherein the user interface for the application is displayed in a landscape orientation while the device is in the second orientation, wherein rotating the user interface for the application into the second orientation includes:

displaying first movement of a portion of the user interface of the application in the portrait orientation off of the display, the portion of the user interface including at least a portion of a first selectable element of the plurality of selectable elements, wherein the first movement is a rotation in a first direction; and displaying second movement of a portion of the user interface of the application in the landscape orientation onto the display, the portion of the user interface including at least a portion of a second selectable element of the plurality of selectable elements, wherein the second movement is a rotation in the first direction.

10. The computer readable storage medium of claim 9, wherein a background appears in corners of the display, behind the user interface, as the user interface of the application begins to rotate.

11. The computer readable storage medium of claim 9, wherein a third selectable element of the plurality of selectable elements remains displayed during the user interface rotation.

12. The computer readable storage medium of claim 9, wherein the user interface of the application is displayed in a bounding region and the bounding region is rotated from the first orientation to the second orientation.

* * * * *